United States Patent
Töpperwien et al.

(10) Patent No.: US 12,405,230 B2
(45) Date of Patent: Sep. 2, 2025

(54) PROCEDURE FOR GENERATING THE DATA FOR THE RECONSTRUCTION OF A VOLUME IN A FLAT OBJECT USING AN X-RAY SYSTEM

(71) Applicant: Comet Yxlon GmbH, Hamburg (DE)

(72) Inventors: Mareike Töpperwien, Hamburg (DE); André Beerlink, Hamburg (DE)

(73) Assignee: Comet Yxlon GmbH, Hamburg (DE)

( * ) Notice: Subject to any disclaimer, the term of this patent is extended or adjusted under 35 U.S.C. 154(b) by 405 days.

(21) Appl. No.: 18/121,380

(22) Filed: Mar. 14, 2023

(65) Prior Publication Data
US 2023/0296534 A1    Sep. 21, 2023

(30) Foreign Application Priority Data

Mar. 15, 2022    (DE) ...................... 10 2022 105 963.4

(51) Int. Cl.
*G01N 23/04* (2018.01)
*G01N 23/083* (2018.01)

(52) U.S. Cl.
CPC ............ *G01N 23/04* (2013.01); *G01N 23/083* (2013.01); *G01N 2223/3307* (2013.01)

(58) Field of Classification Search
CPC ................. G01N 23/04; G01N 23/083; G01N 2223/3307; G01N 23/044; G01N 23/046; G01N 2223/1016; G01N 2223/321; G01N 2223/401; G01N 2223/419; G01N 2223/633; G06T 7/55; G06T 2207/10116; G06T 11/003
See application file for complete search history.

(56) References Cited

U.S. PATENT DOCUMENTS

| 11,022,570 B2 | 6/2021 | Matoba |
| 2005/0074088 A1 | 4/2005 | Ichihara et al. |

FOREIGN PATENT DOCUMENTS

DE    102010010723 A1    9/2011

OTHER PUBLICATIONS

German Examination Reported dated Oct. 28, 2022 for DE 10 2022 105 963.4.
Kurfiss, M.; Streckenbach, G.: Digital Laminography and Computed Tomography with 600 kV for Aerospace Applications. In: Proceedings of the 4th International Symposium on NDT in Aeorspace (2012).

*Primary Examiner* — Courtney D Thomas
(74) *Attorney, Agent, or Firm* — Amster, Rothstein & Ebenstein LLP

(57) ABSTRACT

The present invention relates to a procedure for generating the data for the reconstruction of a volume in a flat object 4 using an X-ray system, which has a tube 1, a detector 3 and an object 4 located between them. According to the invention, a laminography procedure is carried out, which is a combination of an object rotation and a translation, wherein the horizontal and the vertical direction are observed independently of each other, with the result that the resulting trajectory resembles the shape of a cross.

24 Claims, 5 Drawing Sheets

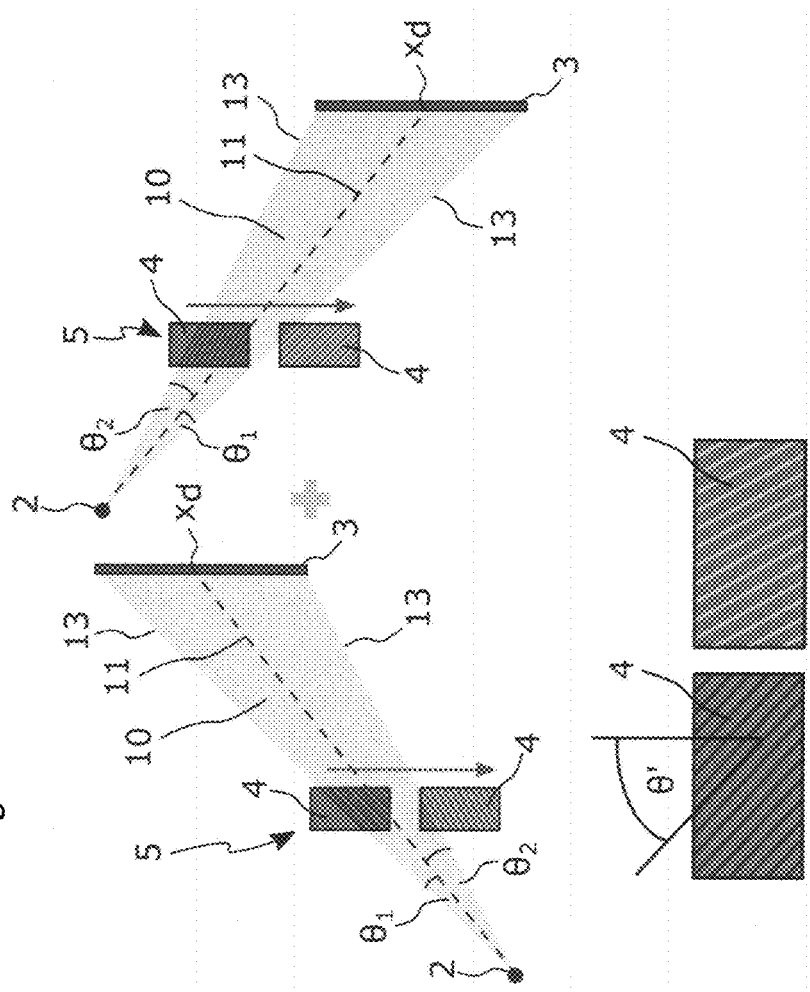
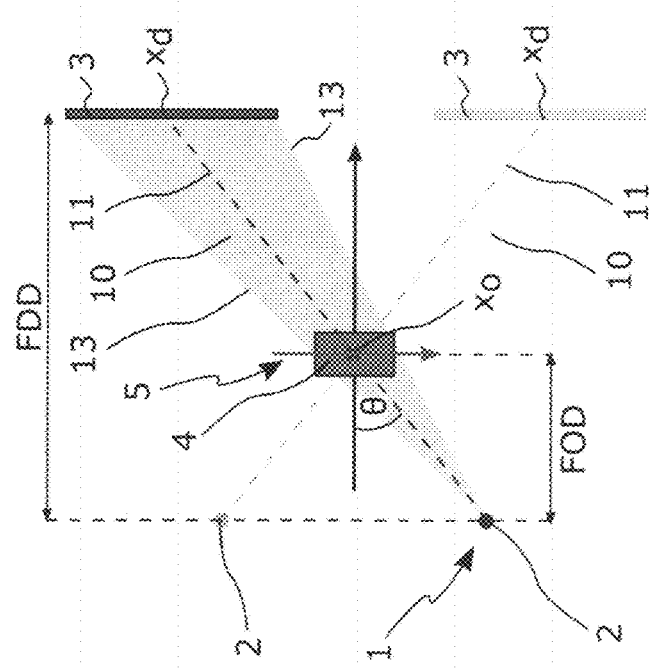
Fig. 2A
Fig. 2B
Fig. 2C

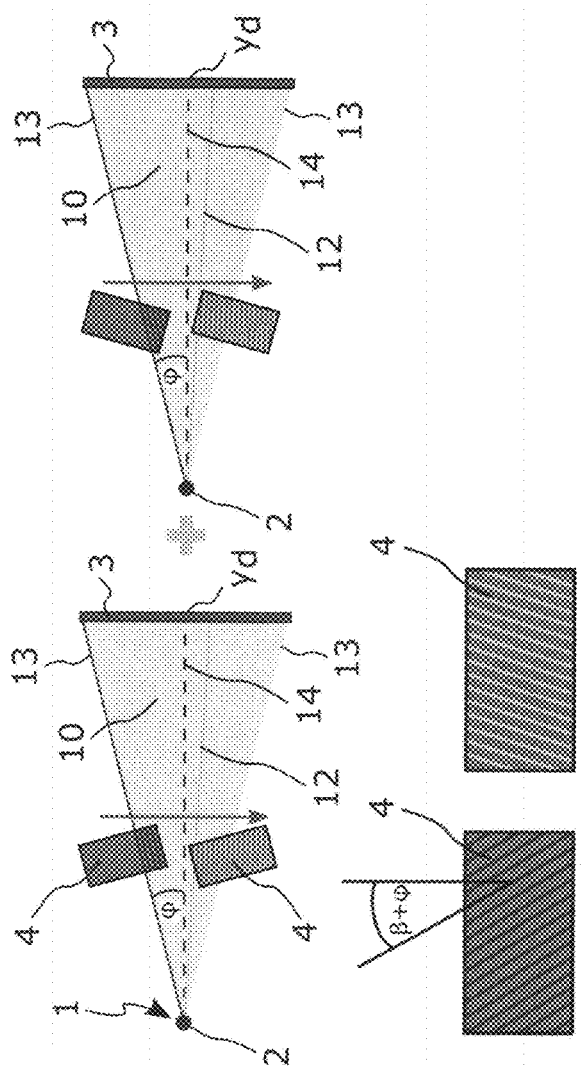
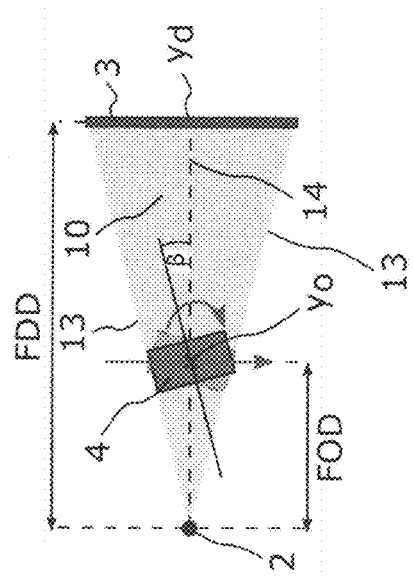
Fig. 3A Fig. 3B Fig. 3C

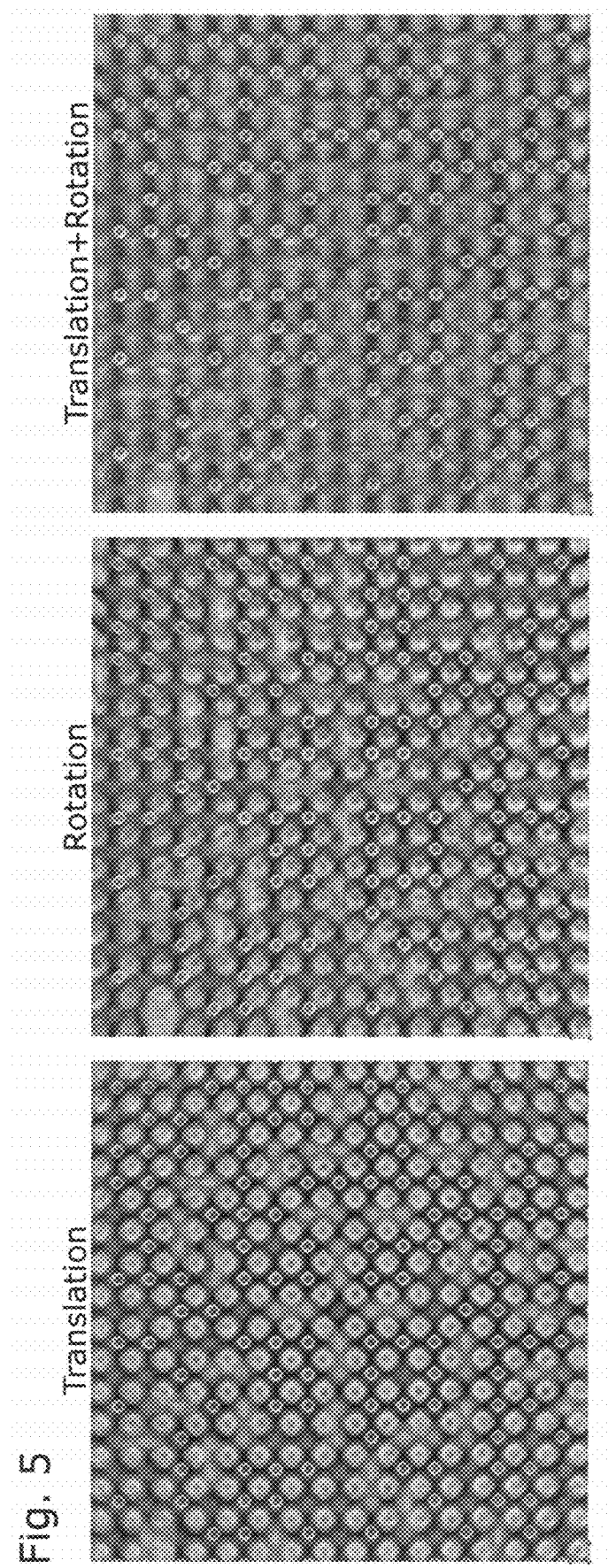

PROCEDURE FOR GENERATING THE DATA FOR THE RECONSTRUCTION OF A VOLUME IN A FLAT OBJECT USING AN X-RAY SYSTEM

CROSS REFERENCE TO RELATED APPLICATIONS

This application claims priority to German Patent Application No. DE 10 2022 105 963.4, filed Mar. 15, 2022, the entire contents of which are expressly incorporated herein by reference thereto.

TECHNICAL FIELD

The present invention relates to a procedure for generating the data for the reconstruction of a volume in a flat object using an X-ray system, which has a tube, a detector and an object located between them.

BACKGROUND OF THE INVENTION

The area of use for the invention is X-ray based material testing. Industrial concerns such as the automobile industry or electronics manufacturers utilize X-ray systems in the context of X-ray based material testing in order to test the properties of objects (in particular component parts). Here, the use of X-rays for imaging provides the possibility of examining concealed structures without destroying the object.

The testing is carried out in an X-ray system which have an X-ray tube (called tube in the following) and an X-ray detector (called detector in the following) as imaging system. The object to be examined is arranged between them. Some or all of the three named components are movable in a translational and/or rotational manner—depending on the X-ray system. The whole device is located in a radiation protection cabin (called cabin in the following). As the geometry of the images made with the X-ray system depends on the focus of the tube, in the following the tube is also referred to merely as focus.

In the destruction-free testing of large flat component parts, such as for example printed circuit boards, a very high magnification and thus resolution can be achieved in 2D images. However, as this merely involves projections through the whole object, all of the structures contained in the object overlap in the recorded image and it is not possible to draw any conclusions about the position of the individual components in terms of depth. Computer tomography, in which the object is observed from many different angles distributed over 360°, provides a possibility to obtain additional depth information. From these images, the three-dimensional object is then reconstructed, with the result that the position of all components in space can be determined. However, as the object needs to be rotated once during this recording without it colliding with the components of the system, it is not possible to achieve as high a magnification M as in 2D testing, as this is determined by the focus-to-detector distance (FDD) and the focus-to-object distance (FOD) (M=FDD/FOD). For the 2D testing, the thickness of the object is thus decisive for the achievable resolution, whereas in the case of CT images above all the width of the object has a limiting effect.

In the context of this application, by an object is meant an article which extends multiple times further in two dimensions (of the surface area) than in its third dimension, which is referred to as depth.

The following laminography procedures are known from the state of the art:

In circular/elliptical laminography, tube and detector move along a circular or elliptical path, in each case in opposite directions, in parallel planes to one another. This laminography procedure thus requires a system in which both the detector and the tube and/or the object (these can be moved equivalently) have a longitudinal and a transverse axis. It makes good sampling in the Fourier space possible but cannot be used on systems which lack at least one of the required axes.

In translational laminography, tube and detector are stationary, while the object is translated fully through the field of view once by means of a manipulator at a constant distance from the tube. This movement corresponds to an object rotation by the exit angle of the beam in parallel beam geometry. This angle is limited by the size of the detector and the distance between tube and detector (provided that the detector is fully illuminated). The following applies: the larger the exit angle of the beam, the better is the depth resolution of the system and the better structures lying one on top of another can be imaged separately from one another. However, this angle is smallest precisely for large magnifications in which the detector is located at a maximum distance from the tube, with the result that here the depth resolution of the system is lowest.

Swing laminography is also known as limited-angle CT. Unlike a normal CT, the object is rotated only by a limited angle by means of a manipulator, wherein this is limited by the geometric circumstances (the object must not collide with the components of the system during the rotation). The bigger the angle range by which the rotation can take place is here, the better is the depth resolution. However, as it is necessary precisely for high resolutions to move the object as close as possible to the source, the achievable laminographic angle, and thus the depth resolution, can become very small as the large flat objects, for which this scanning procedure is particularly well suited, do not allow large angles. Due to the not negligible opening angle of the beam, it is also possible that some areas of the object are never radiographed perpendicularly, with the result that the structures present here may possibly not be correctly resolved.

Linear laminography is very similar to swing laminography. In the event that there is no object rotation but instead tube and detector can be translated using linear motors, the rotation can also be achieved by an opposite linear movement of tube and detector (similar to the case of circular laminography). Unlike swing laminography, here a collision between object and system components is a great deal less likely as the distance of all components from one another remains constant and also no actual rotations take place. However, the laminographic angle is limited by the movement ranges of the tube and the detector and, for compact CT systems, realistically lies in a range of smaller than 15°-20°. In addition, depending on the object geometry, the angle range can also be very asymmetrical. As a result, the depth resolution within the reconstructed volume varies greatly and structures may possibly no longer be well resolved in some parts of the object as they are never radiographed perpendicularly. This behaviour can also arise in swing laminography.

In rotary laminography, the flat object is rotated once fully about an axis which is perpendicular to the object surface and which is inclined relative to the optical axis (either by actually tilting the axis of rotation or by tilting the detector). Thus for this procedure a system is necessary which has either the corresponding object rotation or the corresponding detector tilt axis. On systems which correspond to this design, very large laminographic angles in the region of approximately 60° can be achieved, which makes a very good depth resolution possible. However, systems which do not have the corresponding tilt axes cannot use such a procedure.

In the case of the high-resolution 3D representation of large flat parts, 2D testing and 3D reconstruction in the form of a CT procedure have different advantages and disadvantages. In the case of a 2D image, all components of the object are superimposed and it cannot be clearly seen which structure lies in which plane. If a layer through a CT volume is looked at, for example in the case of a printed circuit board, many structures—such as small pores—cannot be resolved. Also in the case of conventional laminography procedures, as are described above, in a laminography volume, unlike in CT, structures from the layers lying above or below can partly also be seen, wherein they are only represented blurred.

In the known laminography procedures which serve as starting point for the invention, at a high magnification, projections of the object are recorded at different angles, wherein however, unlike in CT, complete data of the object from 360° (or 180°+opening angle) are not available, but only from a very small angle range. From this, conclusions about the position of the individual components along the depth can then be obtained, wherein however the resolution in this spatial direction is lower and depends on the achieved laminographic angle. The bigger the angle range at which the projections can be recorded is, the better is the depth resolution. Which form of laminography is chosen in a particular system largely depends on the construction of the system.

BRIEF SUMMARY OF THE INVENTION

The object of the present invention is to provide a procedure with which both the high resolution of 2D testing can be achieved and at the same time information can be obtained about the position of the individual components of the object in terms of depth.

This object is achieved according to the invention by a procedure with the features of one of claims 1 to 4. Advantageous designs are specified in the dependent claims.

According to them, the object is achieved by a procedure in which the whole trajectory of the constituent parts of the X-ray system includes two different partial trajectories, a vertical partial trajectory and a horizontal partial trajectory. In each of the partial trajectories, two alternatives are possible, which are equivalent to one another. For example, the first partial trajectory can be formed by two vertical movements of the object through the cone beam, wherein these movements is effected one after the other at two different vertically slanted positions of the imaging system composed of tube and detector, wherein the central ray of the cone beam of the tube strikes the detector centrally but not at a right angle. Alternatively, the first partial trajectory can be a vertical pass of the object tilted about a horizontal axis through the cone beam at two different angles, wherein tube and detector are opposite one another such that the centre ray of the cone beam strikes the detector perpendicularly at its coordinate zero point. There are also two equivalent movements for the second partial trajectory. For one thing, a rotation of the object about a vertical axis by two different angles can be effected, for example, wherein the geometry of the stationary imaging system is such that the centre ray strikes the detector perpendicularly at its coordinate zero point, and in each case a translation of the object through the cone beam in the horizontal direction for each of the two angles. For another, the object can be moved through the cone beam in the horizontal direction, one after the other at two different horizontally slanted positions of the imaging system composed of tube and detector, wherein the central ray of the cone beam of the tube strikes the detector centrally but not at a right angle. Through the combination according to the invention of rotation and translation, a better depth resolution is achieved compared with the previously known methods. The four solutions of the independent claims are the possible combinations in each case of one of the two first partial trajectories with one of the two second partial trajectories.

An advantageous development of the invention provides for the object being movable along the $z_o$ axis and the detector being movable along the $z_d$ axis. As a result, the magnification can be varied depending on the examined object.

An advantageous development of the invention provides for the detector being fully illuminated by the cone beam during the taking of each X-ray image. A larger field of view is thereby achieved.

A further advantageous development of the invention provides for the tube being rotatable about the y axis and/or the tube being rotatable about the x axis and/or the detector being rotatable about the $y_d$ axis and/or the detector being rotatable about the $x_d$ axis. Through a rotation of the tube, the detector can still be fully illuminated even when the swivel angle is so large that the opening angle of the cone beam would no longer fully illuminate the detector.

An advantageous development of the invention provides for the central ray always being perpendicular to the surface of the detector, with the result that a constant magnification is achieved over the whole field of view.

An advantageous development of the invention provides for the object passing right through the cone beam during each partial trajectory. This prevents the depth resolution from being greatly reduced at the edge of the object.

A symmetrical movement of the components can be performed with the different partial trajectories. However, as a rule an asymmetrical movement is carried out as individual cases can thus be specifically responded to and in each case the largest laminographic angles can be used and thus a maximum depth resolution can be achieved. The coordinates assigned to an axis in each case (such as for example $y_1$ and $y_2$) are not meant in absolute terms but in each case directed (thus vectorially); they may therefore be equal in absolute terms as long as they point in opposite directions, in order to be able to realize the trajectories according to the invention. The same applies to the angles (for example $\theta_l$ and $\theta_r$) assigned to an axis of rotation.

BRIEF DESCRIPTION OF THE DRAWINGS

Further details and advantages of the invention are now explained in more detail with reference to embodiment examples represented in the drawings. There are shown in:

FIG. 2A a schematic representation of a first alternative of a vertical trajectory;

FIG. 2B the representation of the two configurations divided in two parts which are still represented together in FIG. 2a;

FIG. 2C a representation of the courses of the marginal rays during the recordings in the object in the case of the vertical trajectory;

FIG. 3A a schematic representation of a first alternative of a horizontal trajectory;

FIG. 3B the representation of the two configurations divided in two parts which are still represented together in FIG. 3a;

FIG. 3C a representation of the courses of a marginal ray and a further ray during the recordings in the object in the case of the horizontal trajectory;

FIG. 5 horizontal layer of the printed circuit board from FIG. 4 in the case of translation only, rotation only and in the case of a combination of translation and rotation.

DETAILED DESCRIPTION

Figure 1:
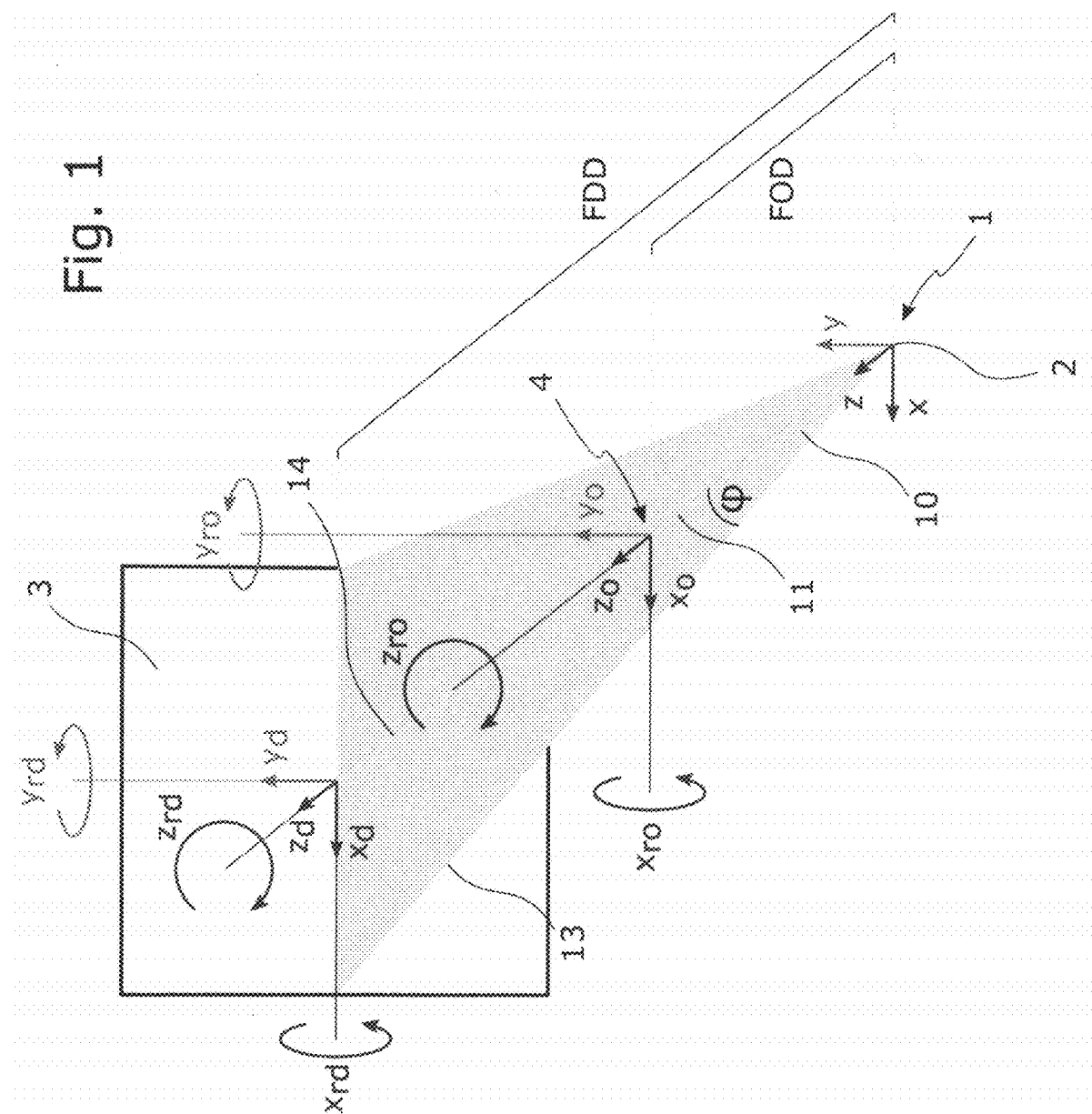
FIG. 1 schematic representation of the system geometry of an X-ray system with a representation of the possible axes of translation and rotation.

The system geometry of an X-ray system, which has a tube 1, an object 4 and a detector 3, is represented schematically in FIG. 1, wherein the respective possible axes of translation and rotation thereof are represented. In the following, only the translational and rotational axes important for the invention are explained, the other axes, which are also represented in FIG. 1, are not described. The rotational axes have an index r and, in the case of the translational axes, no index is present as indication of the translation.

Starting from its focus 2, the tube 1 defines a first Cartesian coordinate system, wherein the centre ray 14 of the emitted cone beam 10 of the X-radiation forms the z axis. The vertical direction is the y axis and the remaining horizontal direction (in addition to the likewise horizontally running z axis) is the x axis. The y axis can be formed not only as a translational axis but also as an axis of rotation; then the cone beam 10 could be repositioned if there is a very slanted geometry in which the detector 3 would be outside the cone beam 10 in the case of a non-rotated tube 1. However, as rotation is not used for the described embodiment examples of the invention, a representation of this axis was omitted. With regard to the embodiment examples of the invention, the represented position of the tube 1 is referred to as central position.

The detector 3 is a flat panel detector; in FIG. 1 it is formed square, wherein this is not limitative. The centre ray 14 of the tube 1 strikes the detector 3 centrally, as a result of which the origin of a second Cartesian coordinate system is defined. The axes of this detector coordinate system have the index d. The $z_d$ axis runs perpendicularly on its surface in the horizontal direction, and identically to the z axis of the tube 1. The vertical direction, which extends in the detector 3, is also the $y_d$ axis here and the horizontal direction extending in the detector 3 is the $x_d$ axis. With regard to the embodiment examples of the invention, the represented position of the detector 3 is referred to as central position.

The object 4, the axes of which have the index o, is located between tube 1 and detector 3. With regard to the embodiment examples of the invention, the represented position of the object 4 is referred to as neutral position 5, in which no rotation (and also no translation) has taken place. A third Cartesian coordinate system is assigned to the object 4, the origin of which lies at a point which lies on the centre ray of the tube 1—thus the z axis. In the neutral position 5 of the object 4, the $z_o$ axis extends along the z axis in the horizontal direction. The $y_o$ axis runs in the vertical direction and, in the represented neutral position 5 of the object 4, the $x_o$ axis runs parallel to the $y_d$ axis of the detector 3 in the horizontal direction. In addition to the three translational axes, the object 4 also has two rotational axes. Both the $x_o$ axis and the $y_o$ axis are also axes of rotation, thus the $x_{ro}$ axis and the $y_{ro}$ axis—wherein these axes can also be replaced by an equivalent movement of the tube 1 and the detector 3.

In FIG. 1, the distances of the $y_o$ axis from the focus 2 (FOD) and of the detector 3 from the focus 2 along the centre ray 14 (FDD) are also represented, on the basis of which the magnification M of the represented geometry can be determined; as already indicated above, it equals FDD/FOD.

For a person skilled in the art, it goes without saying that the orientation of the axes in FIG. 1 is not limitative, but that the invention also comprises all other orientations, thus for example if the z axis runs vertically or the whole system is tilted by a (desired) angle about the x axis and/or one of the other two axes (y axis and z axis).

The X-ray system additionally has a storage device, in which the data of the individual X-ray images are stored, and a processing device, in which the reconstruction of the object 4 using the above-named data is effected, together with a representation device connected thereto, such as for example a monitor, on which the reconstruction can be viewed. The components tube 1, object 4 and detector 3 are arranged in a radiation protection cabin so that the X-radiation used does not result in any damage to the health of any people located in the vicinity. The above-named components and their design, their cooperation and their arrangement are well known to a person skilled in the art, with the result that further statements in relation to this can be omitted.

For the trajectories according to the invention described in FIGS. 2 and 3, an X-ray system is required in which the tube 1 can carry out a y translation (y axis), the detector 3 can carry out both a y translation ($y_d$ axis) and a z translation ($z_d$ axis), which is necessary for adjusting the magnification, and the object 4, in addition to a translation along each of its three axes ($x_o$, $y_o$ and $z_o$ axis) can also carry out a rotation both about the $x_o$ axis (the name of which is thus $x_{ro}$ axis—wherein this axis can also be replaced by an equivalent translation of the tube 1/of the object 4 and of the detector 3) and about the $y_o$ axis (the name of which is thus $y_{ro}$ axis—wherein this axis can also be replaced by an equivalent translation of the tube 1/of the object 4 and of the detector 3).

FIGS. 2a and 2b are side views—thus effectively a view in the x direction—onto the schematically represented three components of the X-ray system, tube 1, object 4 and detector 3. The vertical trajectory is described with reference to these FIGS., wherein the difference between the two FIGS. is that the two relevant positions are represented still together in FIG. 2a and the two positions are represented separately from one another in FIG. 2b. The view corresponds in each case to the yz plane.

The tube 1 emits a cone beam, which has a half opening angle cp and illuminates the whole detector 3 along the $y_d$ axis. This whole illumination is present both when the detector 3 is at its upper extreme point and at its lower extreme point. The two extreme points of the detector 3 lie on the $y_d$ axis, removed by $y_{d1}$ or $y_{d2}$, respectively, wherein, in the represented embodiment example, they are opposing and equal, with the result that there is a symmetrical design about the z axis. At the same time, the tube 1 has been moved either to its lower extreme point or to its upper extreme point. In the case of the two extreme points of the detector 3, the coordinate origins of the first Cartesian coordinate system lie on the y axis, removed by a second distance $y_1$ or by a sixth distance $y_2$, respectively—relative to the y axis in the central position of the tube 1, wherein they are opposing and equal, with the result that there is a symmetrical design about the z axis. The distances $y_{d1}$ and $y_1$ or $y_{d2}$ and $y_2$, respectively are matched to each other depending on the magnification M (FDD/FOD). The axis of the central ray 11 of the cone beam 10 is inclined relative to the z axis by the angle of inclination θ or −θ, respectively. There are the following values in the embodiment example: FDD=1200 mm, FOD=500 mm, $y_{d1}$=+547 mm, $y_{d2}$=−547 mm, $y_1$=−391 mm, $y_2$=+391 mm, θ=38°, $θ_1$=8°, θ'=46°.

FIG. 2*b* shows the translation of the object 4 well. The object 4 is moved once right through the cone beam 10 along the $y_o$ axis in the configuration in which the tube 1 is at its lower extreme point and the detector 3 is at its upper extreme point (left-hand part of FIG. 2*b*) and once in the mirror-inverted arrangement, thus when the tube 1 is at its upper extreme point and the detector 3 is at its lower extreme point. The extreme points, together with their distances, correspond to those according to FIG. 2*a*. Along the translation—in which it does not matter whether it is effected from top to bottom or from bottom to top—X-ray images are made at predefinable distances of ~10 mm per movement of the object 4 through the cone beam 50 (thus 100 X-ray images for the whole vertical trajectory 100).

In FIG. 2*c*, the patterns for the two marginal rays 13 which are formed during the translation of the object 4 according to the situation shown on the left in FIG. 2*b* are represented. The angle between these patterns in the object 4 and the $z_o$ axis is θ' and, for the upper marginal ray 13 according to the left-hand situation in FIG. 2*b*, is the sum of the above-indicated angle of inclination θ and the upper partial opening angle $θ_1$ of the cone beam 10—this is represented in the left-hand part of FIG. 2*c*. The representation of the right-hand part of FIG. 2*c* is the corresponding pattern for the lower marginal ray 13 according to the left-hand configuration in FIG. 2*b*. Here, the resultant angle is the difference between θ and the lower partial opening angle $θ_2$. The two partial opening angles $θ_1$ and $θ_2$ depend on the geometry of the X-ray system, in particular on FOD, FDD and θ. For the situation according to the right-hand situation in FIG. 2*b*, the result is the mirror-inverted situation for the patterns as represented in FIG. 2*c*. Since—as stated above—θ' is 8° bigger than θ, the laminographic angle for the vertical trajectory is 46°, which results in a higher depth resolution.

In addition to the design of the vertical trajectory, which was described with reference to FIG. 2, a horizontal trajectory is also provided according to the invention and is explained in the following with reference to FIG. 3.

FIGS. 3*a* and 3*b* are top views—thus effectively a view in the y direction—onto the schematically represented three components of the X-ray system, tube 1, object 4 and detector 3. The horizontal trajectory is described with reference to these FIGS., wherein the two situations for carrying out the translational movements still represented together in FIG. 3*a* are represented separately in FIG. 3*b*. The view corresponds to the xz plane.

While passing through the horizontal trajectory, there is always a beam geometry, as was described above for translational laminography and in FIG. 1, with a half opening angle φ, wherein the whole detector 3 is continuously illuminated along the $x_d$ axis.

The object 4 is rotated out of the neutral position by a first angle of rotation $β_l$ about the $y_o$ axis (left-hand side of FIG. 3*b*). On the right-hand side of FIG. 3*b*, the object 4 is rotated in the opposite direction by a second angle of rotation $β_r$ (starting from the neutral position of the object 4). In the represented case, these two angles of rotation are the same size in absolute terms (15°) but directed in opposite directions. As a result, a larger laminographic angle is obtained, which corresponds to the sum of the half opening angle φ and the first/second angle of rotation $β_l/β_r$. This makes a larger depth resolution possible.

The translation along the $x_o$ axis can be clearly seen in FIG. 3*b*. The object 4 is moved right through the cone beam 10 parallel to the x axis, once in the configuration in which the object 4 was rotated by the first angle of rotation $β_l$ out of the neutral position 5 of the object 4 (left-hand representation in FIG. 3*b*) and once in the mirror-inverted arrangement, thus when the object 4 was rotated by the second angle of rotation $β_r$ out of the neutral position 5 of the object 4 (right-hand representation in FIG. 3*b*). In the translations, 50 X-ray images are made at predefinable distances—which are the same in the embodiment example as in the case of the vertical trajectory—along the movement direction at a distance of ~10 mm per movement of the object through the cone beam. The movement direction —whether in the positive or negative x direction—is irrelevant; the necessary X-ray images can thus be made for example in a movement back and forth.

In FIG. 3*c*, the patterns of the upper marginal ray 13 in FIG. 3*b* and of the further ray 12, which is located inside the cone beam 10 and in this FIG. is represented below the central ray 11, are represented. The angle between these patterns in the object 4 and the z axis is φ+$β_l$ for the upper marginal ray 13 according to the right-hand situation in FIG. 3*b*. This is represented in the left-hand part of FIG. 3*c*. The representation of the right-hand part of FIG. 3*c* is the corresponding pattern for the ray represented continuous and running slightly below the centre ray 13 in the left-hand part of FIG. 3*b*. The resultant angle for the left-hand part of FIG. 3*c* is 30°. A larger laminographic angle, which corresponds to the sum of φ and the first/second angle of rotation $β_l/β_r$, is thus obtained compared to translational laminography, in which the laminographic angle is determined by the half opening angle φ (here 15°). This makes a larger depth resolution possible.

Volume data are then generated from the projections with the aid of a suitable reconstruction procedure known to a person skilled in the art.

Figure 4:
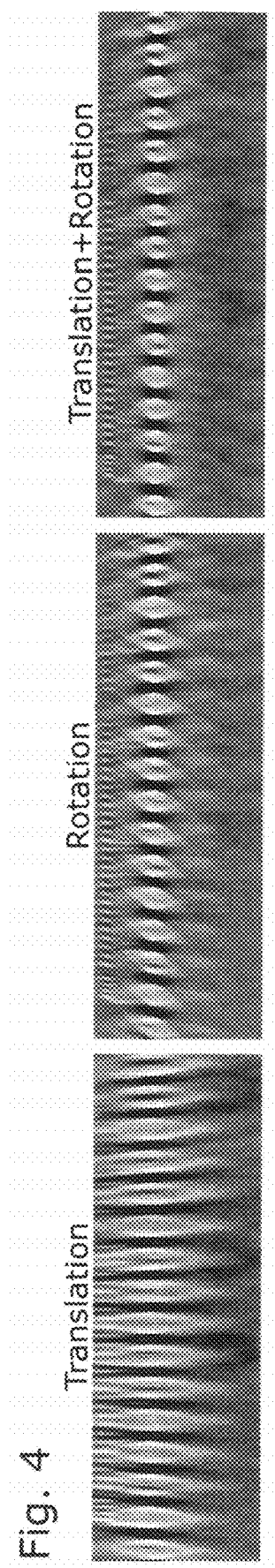
FIG. 4 transverse layer of a printed circuit board in the case of translation only, rotation only and in the case of a combination of translation and rotation.

FIG. 4 shows an exemplary transverse layer (side view)—corresponding to the procedure according to FIG. 2—of a printed circuit board—which here is the object 4, which was recorded with three different laminography procedures. The structures shown (they are BGAs), should appear round from this direction. However, the reduced depth resolution of laminography procedures compared to CT scans results in blurring of the structures, which is more strongly pronounced in the case of small laminographic angles. The result of translational laminography (horizontal and vertical) is shown on the left-hand side. Here, the depth resolution is limited by the opening angle of the X-ray (~20°). In the middle, the result of a combination of linear (vertical) and swing laminography (horizontal) can be seen, in which a better depth resolution is made possible due to the large possible angle ranges in this case (vertical: ~20°, horizontal: ~55°). The right-hand side shows the result in the case of a procedure according to the invention. In this case, the best depth resolution can be achieved due to the largest resultant laminographic angle ranges (vertical: ~40°, horizontal: ~75°). The above-mentioned actual circular shape of the structures is most closely achieved by the combination of translation and rotation.

FIG. 5 shows an exemplary reconstructed lateral layer—corresponding to the procedure according to FIG. 3—of the printed circuit board from FIG. 4 recorded with the same laminography procedures as shown in FIG. 4. Here too, the different depth resolutions of the different methods can be clearly seen, as only the ring-shaped structures in this layer should be able to be seen, while the blurred structures of the round BGAs lying in other layers become less visible the larger the laminographic angle becomes (from left to right). In addition, a possible disadvantage of linear laminography can be seen here, which can arise in the case of asymmetrical angles (in the case of corresponding angle ranges this should also be visible in the case of swing laminography). The smaller of the two angles (~5° compared with ~15° in the other direction) in combination with the opening angle of the X-ray results in the ring structures not being radiographed perpendicularly in all areas of the image, with the result that they cannot be correctly resolved. This can be seen in the upper area in the middle image. The translation of the object 4 in the other two methods prevents this artefact from arising.

In summary it can be said that, in the invention—in order to increase the angle range for the laminography—the two trajectories are combined in a suitable manner, with the result that the object 4 is translated in the rotated state through the field of view both in the horizontal and in the vertical direction (wherein, in the vertical direction, the object rotation can also be realized through a simultaneous displacement of tube 1 and detector 3—when the corresponding axes are present, this can also happen in the horizontal direction). A laminography procedure is carried out, which is a combination of an object rotation and a translation, wherein the horizontal and the vertical direction are observed independently of each other, with the result that the resulting trajectory resembles the shape of a cross.

In order to increase the angle range for the laminography, in the present invention the two trajectories (the vertical and the horizontal) are combined in a suitable manner, with the result that the object 4 is moved in the rotated state through the field of view both in the horizontal and in the vertical direction. In the process, in each case only the maximum possible angles in the four spatial directions (top, bottom, left, right) are approached, with the result that in the simplest case the object 4 is moved through the field of view twice, both in the vertical and in the horizontal direction. It is not absolutely necessary for the maximum possible angles in each case to be symmetrical in the horizontal and vertical directions, respectively. If the achievable angle range is larger than the opening angle of the cone beam 10, intermediate angles are also approached in addition to the maximum angles and the number of translations through the field of view is correspondingly increased.

LIST OF REFERENCE NUMBERS 1 (X-ray) tube
2 focus
3 (X-ray) detector
4 object
5 neutral position
10 cone beam
11 central ray
12 further ray
13 marginal ray
14 centre ray

What is claimed is:

1. A procedure for generating the data for the reconstruction of a volume in a flat object (4) using an X-ray system, which has three imaging components, namely a tube (1), a detector (3) and an object (4) located between them, wherein the tube (1) has a focus (2), which, in a central position of the tube (1), forms the coordinate origin of a first Cartesian coordinate system, and emits a cone beam (10), the centre ray (14) of which forms the z axis of the first coordinate system and the x axis runs horizontally,
wherein, in a central position of the detector (3), the centre ray (14) strikes the detector (3) perpendicularly and this point of impact forms the origin of a second Cartesian coordinate system, the $z_d$ axis of which, in the central position of the detector (3), is identical to the z axis in the central position of the tube (1) and the $x_d$ axis runs horizontally,
wherein, in a neutral position (5) of the object (4), the object (4) has a third Cartesian coordinate system, the origin of which is the intersection between the centre ray (14) of the central position of the tube (1) and a vertically running axis of rotation of the object (4), the $z_o$ axis of which, in its neutral position (5), coincides with the centre ray (14) in the central position of the tube (1) and the $x_o$ axis of which, in its neutral position (5), runs parallel to the x axis in the central position of the tube (1),
wherein at least two of the three imaging components are movable along their respective y axis, thus the tube (1) along the y axis according to its central position, the detector (3) along the $y_d$ axis according to its central position, the object (4) along the $y_o$ axis according to its neutral position (5),
wherein the object (4) is movable along the $x_o$ axis according to its neutral position (5) and rotatable about the $y_o$ axis according to its neutral position (5),
passing through a vertical trajectory with the following steps:
a1) moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a first swivel angle $\theta_u$ between a central ray (11) and the z axis in the yz plane, wherein the detector (3) has a $y_{d1}$ coordinate and the tube (1) has a $y_1$ coordinate, wherein a central ray (11) strikes the detector (3) at the origin of the second Cartesian coordinate system;
b1) then moving the object (4) along the $y_o$ axis from a first extreme point to a second extreme point, wherein X-ray images, which are stored in a storage medium, are made at predefinable distances along the movement, wherein the first extreme point has a $y_{o1}$ coordinate and the second extreme point has a $y_{o2}$ coordinate, wherein the object (4) has passed at least partially through the X-ray;
c1) then moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a second swivel angle $\theta_o$ between a central ray (11) and the z axis in the yz plane, wherein the detector (3) has a $y_{d2}$ coordinate and the tube (1) has a $y_2$ coordinate and the central ray (11) strikes the detector (3) at the origin of the second Cartesian coordinate system and wherein $y_2 \neq y_1$ and $y_{d2} \neq y_{d1}$;

d1) then moving the object (4) along the $y_o$ axis from a third extreme point to a fourth extreme point, wherein X-ray images, which are stored in a storage medium, are made at predefinable distances along the movement, wherein the third extreme point has a $y_{o3}$ coordinate and the fourth extreme point has a $y_{o4}$ coordinate, wherein the object (4) has passed at least partially through the X-ray;

passing through a horizontal trajectory with the following steps:

e1) moving the tube (1), the detector (3) and the object (4) into a configuration in which the tube (1) and the detector (3) are located in their respective central position and the object (4) is located in its neutral position (5);

f1) then rotating the object (4) out of its neutral position (5) by a first angle of rotation $\beta_l$ about the $y_o$ axis and moving the object (4) parallel to the x axis of the tube (1) in its central position from a fifth extreme point to a sixth extreme point, wherein X-ray images, which are stored in a storage medium, are made at predefinable distances along the movement, wherein the fifth extreme point has an $x_{o1}$ coordinate and the sixth extreme point has an $x_{o2}$ coordinate, wherein the object (4) has passed at least partially through the X-ray;

g1) then rotating the object (4) by a second angle of rotation $\beta_r$, wherein $\beta_r \neq \beta_l$, about the $y_o$ axis and moving the object (4) parallel to the x axis of the tube (1) in its central position from a seventh extreme point to an eighth extreme point, wherein X-ray images, which are stored in a storage medium, are made at predefinable distances along the movement, wherein the seventh extreme point has [about] an $x_{o3}$ coordinate and the eighth extreme point has an $x_{o4}$ coordinate, wherein the object (4) has passed at least partially through the X-ray.

2. The procedure according to claim 1, wherein the object (4) is movable along the $z_o$ axis and the detector (3) is movable along the $z_d$ axis.

3. The procedure according to claim 1, wherein the detector (3) is fully illuminated by the cone beam (10) during the taking of each X-ray image.

4. The procedure according to claim 1, wherein the tube (1) is rotatable about the y axis and/or the tube (1) is rotatable about the x axis and/or the detector (3) is rotatable about the $y_d$ axis and/or the detector (3) is rotatable about the $x_d$ axis.

5. The procedure according to claim 4, wherein the central ray (11) is always perpendicular to the surface of the detector (3).

6. The procedure according to claim 1, wherein the object (4) passes right through the cone beam (10) during each partial trajectory.

7. A procedure for generating the data for the reconstruction of a volume in a flat object (4) using an X-ray system, which has three imaging components, namely a tube (1), a detector (3) and an object (4) located between them, wherein the tube (1) has a focus (2), which, in a central position of the tube (1), forms the coordinate origin of a first Cartesian coordinate system, and emits a cone beam (10), the centre ray (14) of which forms the z axis of the first coordinate system and the x axis runs horizontally, wherein, in a central position of the detector (3), the centre ray (14) strikes the detector (3) perpendicularly and this point of impact forms the origin of a second Cartesian coordinate system, the $z_d$ axis of which, in the central position of the detector (3), is identical to the z axis in the central position of the tube (1) and the $x_d$ axis runs horizontally, wherein, in a neutral position (5) of the object (4), the object (4) has a third Cartesian coordinate system, the origin of which is the intersection between the centre ray (14) of the central position of the tube (1) and a vertically running axis of rotation of the object (4), the $z_o$ axis of which, in its neutral position (5), coincides with the centre ray (14) in the central position of the tube (1) and the $x_o$ axis of which, in its neutral position (5), runs parallel to the x axis in the central position of the tube (1), wherein at least two of the three imaging components are movable along their respective y axis and their respective x axis, thus the tube (1) along the y axis/x axis according to its central position, the detector (3) along the $y_d$ axis/$x_d$ axis according to its central position, the object (4) along the $y_o$ axis/$x_o$ axis according to its neutral position (5), with the following steps:

passing through a vertical trajectory with the following steps:

a2) moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a first swivel angle $\theta_u$ between a central ray and the z axis in the yz plane, wherein the detector (3) has a $y_{d1}$ coordinate and the tube (1) has a $y_1$ coordinate, wherein a central ray (11) strikes the detector (3) at the origin of the second Cartesian coordinate system;

b2) then moving the object (4) along the $y_o$ axis from a first extreme point to a second extreme point, wherein X-ray images, which are stored in a storage medium, are made at predefinable distances along the movement, wherein the first extreme point has a $y_{o1}$ coordinate and the second extreme point has a $y_{o2}$ coordinate, wherein the object (4) has passed at least partially through the X-ray;

c2) then moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a second swivel angle $\theta_o$ between a central ray and the z axis in the yz plane, wherein the detector (3) has a $y_{d2}$ coordinate and the tube (1) has a $y_2$ coordinate and the central ray (11) strikes the detector (3) at the origin of the second Cartesian coordinate system and wherein $y_2 \neq y_1$ and $y_{d2} \neq y_{d1}$;

d2) then moving the object (4) along the $y_o$ axis from a third extreme point to a fourth extreme point, wherein X-ray images, which are stored in a storage medium, are made at predefinable distances along the movement, wherein the third extreme point has a $y_{o3}$ coordinate and the fourth extreme point has a $y_{o4}$ coordinate, wherein the object (4) has passed at least partially through the X-ray;

passing through a horizontal trajectory with the following steps:

e2) moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a first angle of rotation $\beta_l$ between a central ray (11) and the z axis in the xz plane, wherein the detector (3) has an $x_{d1}$ coordinate and the tube (1) has an $x_1$ coordinate, wherein a central ray (11) strikes the detector (3) at the origin of the second Cartesian coordinate system;

f2) then moving the object (4) along the $x_o$ axis from a fifth extreme point to a sixth extreme point, wherein X-ray images, which are stored in a storage medium, are made at predefinable distances along the movement, wherein the fifth extreme point has an $x_{o1}$ coordinate and the sixth extreme point has an $x_{o2}$ coordinate, wherein the object (4) has passed at least partially through the X-ray;

g2) then moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a second angle of rotation $\beta_r$ between a central ray (11) and the z axis in the xz plane, wherein the detector (3) has an $x_{d2}$ coordinate and the tube (1) has an $x_2$ coordinate and the central ray (11) strikes the detector (3) at the origin of the second Cartesian coordinate system, wherein $x_2 \neq x_1$ and $x_{d2} \neq x_{d1}$;

h2) then moving the object (4) along the $x_o$ axis from a seventh extreme point to an eighth extreme point, wherein X-ray images, which are stored in a storage medium, are made at predefinable distances along the movement, wherein the seventh extreme point has an $x_{o3}$ coordinate and the eighth extreme point has an $x_{o4}$ coordinate, wherein the object (4) has passed at least partially through the X-ray.

8. The procedure according to claim 7, wherein the object (4) is movable along the $z_o$ axis and the detector (3) is movable along the $z_d$ axis.

9. The procedure according to claim 7, wherein the detector (3) is fully illuminated by the cone beam (10) during the taking of each X-ray image.

10. The procedure according to claim 7, wherein the tube (1) is rotatable about the y axis and/or the tube (1) is rotatable about the x axis and/or the detector (3) is rotatable about the $y_d$ axis and/or the detector (3) is rotatable about the $x_d$ axis.

11. The procedure according to claim 10, wherein the central ray (11) is always perpendicular to the surface of the detector (3).

12. The procedure according to claim 7, wherein the object (4) passes right through the cone beam (10) during each partial trajectory.

13. A procedure for generating the data for the reconstruction of a volume in a flat object (4) using an X-ray system, which has a tube (1), a detector (3) and an object (4) located between them,
wherein the tube (1) has a focus (2), which, in a central position of the tube (1), forms the coordinate origin of a first Cartesian coordinate system, and emits a cone beam (10), the centre ray (14) of which forms the z axis of the first coordinate system and the x axis runs horizontally,
wherein, in a central position of the detector (3), the centre ray (14) strikes the detector (3) perpendicularly and this point of impact forms the origin of a second Cartesian coordinate system, the $z_d$ axis of which, in the central position of the detector (3), is identical to the z axis in the central position of the tube (1) and the $x_d$ axis runs horizontally,
wherein, in a neutral position (5) of the object (4), the object (4) has a third Cartesian coordinate system, the origin of which is the intersection between the centre ray (14) of the central position of the tube (1) and a vertically running axis of rotation of the object (4), the $z_o$ axis of which, in its neutral position (5), coincides with the centre ray (14) in the central position of the tube (1) and the $x_o$ axis of which, in its neutral position (5), runs parallel to the x axis in the central position of the tube (1),
wherein the tube (1) is movable along they axis according to its central position,
wherein at least two of the three imaging components are movable along their respective x axis, thus the tube (1) along the x axis according to its central position, the detector (3) along the $x_d$ axis according to its central position, the object (4) along the $x_o$ axis according to its neutral position (5),
wherein the object (4) is movable about the $y_o$ axis according to its neutral position (5) and rotatable along the $x_o$ axis in each case according to its neutral position (5),
with the following steps:
passing through a vertical trajectory with the following steps:
a3) moving the three imaging components into the basic position, in which the z, $z_o$ and $z_d$ axes coincide and the x, $x_o$ and $x_d$ axes run parallel to each other, and rotating the object (4) by a first swivel angle $\theta_u$ about the $x_o$ axis;

b3) then moving the object (4) along the $y_o$ axis from a first extreme point to a second extreme point, wherein X-ray images, which are stored in a storage medium, are made at predefinable distances along the movement, wherein the first extreme point has a $y_{o1}$ coordinate and the second extreme point has a $y_{o2}$ coordinate, wherein the object (4) has passed at least partially through the X-ray;

c3) then rotating the object (4) by a second swivel angle $\theta_o$, which differs from the first swivel angle $\theta_u$, about the $x_o$ axis;

d3) then moving the object (4) along the $y_o$ axis from a third extreme point to a fourth extreme point, wherein X-ray images, which are stored in a storage medium, are made at predefinable distances along the movement, wherein the third extreme point has a $y_{o3}$ coordinate and the fourth extreme point has a $y_{o4}$ coordinate, wherein the object (4) has passed at least partially through the X-ray;

passing through a horizontal trajectory with the following steps:

e3) moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a first angle of rotation $\beta_l$ between a central ray (11) and the z axis in the xz plane, wherein the detector (3) has an $x_{d1}$ coordinate and the tube (1) has an $x_1$ coordinate, wherein a central ray (11) strikes the detector (3) at the origin of the second Cartesian coordinate system;

f3) then moving the object (4) along the $x_o$ axis from a fifth extreme point to a sixth extreme point, wherein X-ray images, which are stored in a storage medium, are made at predefinable distances along the movement, wherein the fifth extreme point has an $x_{o1}$ coordinate and the sixth extreme point has an $x_{o2}$ coordinate, wherein the object (4) has passed at least partially through the X-ray;

g3) then moving at least two of the three imaging components into a configuration in which at least two of the three imaging components are located outside the basic position, the z, $z_o$ and $z_d$ axes run parallel to each other, the x, $x_o$ and $x_d$ axes run parallel to each other and there is a second angle of rotation $β_r$ between a central ray (11) and the z axis in the xz plane, wherein the detector (3) has an $x_{d2}$ coordinate and the tube (1) has an $x_2$ coordinate and the central ray (11) strikes the detector (3) at the origin of the second Cartesian coordinate system, wherein $x_2 \neq x_1$ and $x_{d2} \neq x_{d1}$;

h3) then moving the object (4) along the $x_o$ axis from a seventh extreme point to an eighth extreme point, wherein X-ray images, which are stored in a storage medium, are made at predefinable distances along the movement, wherein the seventh extreme point has an $x_{o3}$ coordinate and the eighth extreme point has an $x_{o4}$ coordinate, wherein the object (4) has passed at least partially through the X-ray.

14. The procedure according to claim 13, wherein the object (4) is movable along the $z_o$ axis and the detector (3) is movable along the $z_d$ axis.

15. The procedure according to claim 13, wherein the detector (3) is fully illuminated by the cone beam (10) during the taking of each X-ray image.

16. The procedure according to claim 13, wherein the tube (1) is rotatable about the y axis and/or the tube (1) is rotatable about the x axis and/or the detector (3) is rotatable about the $y_d$ axis and/or the detector (3) is rotatable about the $x_d$ axis.

17. The procedure according to claim 16, wherein the central ray (11) is always perpendicular to the surface of the detector (3).

18. The procedure according to claim 13, wherein the object (4) passes right through the cone beam (10) during each partial trajectory.

19. A procedure for generating the data for the reconstruction of a volume in a flat object (4) using an X-ray system, which has a tube (1), a detector (3) and an object (4) located between them, wherein the tube (1) has a focus (2), which, in a central position of the tube (1), forms the coordinate origin of a first Cartesian coordinate system, and emits a cone beam (10), the centre ray (14) of which forms the z axis of the first coordinate system and the x axis runs horizontally, wherein, in a central position of the detector (3), the centre ray (14) strikes the detector (3) perpendicularly and this point of impact forms the origin of a second Cartesian coordinate system, the $z_d$ axis of which, in the central position of the detector (3), is identical to the z axis in the central position of the tube (1) and the $x_d$ axis runs horizontally, wherein, in a neutral position (5) of the object (4), the object (4) has a third Cartesian coordinate system, the origin of which is the intersection between the centre ray of the central position of the tube (1) and a vertically running axis of rotation of the object (4), the $z_o$ axis of which, in its neutral position, coincides with the centre ray (14) in the central position of the tube (1) and the $x_o$ axis of which, in its neutral position (5), runs parallel to the x axis in the central position of the tube (1), wherein the object (4) is movable along the $x_o$ axis and the $y_o$ axis in each case according to its neutral position (5), rotatable about the $x_o$ axis and the $y_o$ axis in each case according to its neutral position (5), with the following steps:
passing through a vertical trajectory with the following steps:

a4) moving the three imaging components into the basic position, in which the z, $z_o$ and $z_d$ axes coincide and the x, $x_o$ and $x_d$ axes run parallel to each other, and rotating the object (4) by a first swivel angle $θ_u$ about the $x_o$ axis;

b4) then moving the object (4) along the $y_o$ axis from a first extreme point to a second extreme point, wherein X-ray images, which are stored in a storage medium, are made at predefinable distances along the movement, wherein the first extreme point has a $y_{o1}$ coordinate and the second extreme point has a $y_{o2}$ coordinate, wherein the object (4) has passed at least partially through the X-ray;

c4) then rotating the object (4) by a second swivel angle Go, which differs from the first swivel angle $θ_u$, about the $x_o$ axis;

d4) then moving the object (4) along the $y_o$ axis from a third extreme point to a fourth extreme point, wherein X-ray images, which are stored in a storage medium, are made at predefinable distances along the movement, wherein the third extreme point has a $y_{o3}$ coordinate and the fourth extreme point has a $y_{o4}$ coordinate, wherein the object (4) has passed at least partially through the X-ray;

passing through a horizontal trajectory with the following steps:

e4) moving the tube (1), the detector (3) and the object (4) into a configuration in which the tube (1) and the detector (3) are located in their respective central position and the object (4) is located in its neutral position (5);

f4) then rotating the object (4) out of its neutral position (5) by a first angle of rotation $β_l$ about the $y_o$ axis and moving the object (4) parallel to the x axis of the tube (1) in its central position from a fifth extreme point to a sixth extreme point, wherein X-ray images, which are stored in a storage medium, are made at predefinable distances along the movement, wherein the fifth extreme point has an $x_{o1}$ coordinate and the sixth extreme point has an $x_{o2}$ coordinate, wherein the object (4) has passed at least partially through the X-ray;

g4) then rotating the object (4) by a second angle of rotation $β_r$, wherein $β_r \neq β_l$, about the $y_o$ axis and moving the object (4) parallel to the x axis of the tube (1) in its central position from a seventh extreme point to an eighth extreme point, wherein X-ray images, which are stored in a storage medium, are made at predefinable distances along the movement, wherein the seventh extreme point has [about] an $x_{o3}$ coordinate and the eighth extreme point has an $x_{o4}$ coordinate, wherein the object (4) has passed at least partially through the X-ray.

20. The procedure according to claim 19, wherein the object (4) is movable along the $z_o$ axis and the detector (3) is movable along the $z_d$ axis.

21. The procedure according to claim 19, wherein the detector (3) is fully illuminated by the cone beam (10) during the taking of each X-ray image.

22. The procedure according to claim 19, wherein the tube (1) is rotatable about the y axis and/or the tube (1) is rotatable about the x axis and/or the detector (3) is rotatable about the $y_d$ axis and/or the detector (3) is rotatable about the $x_d$ axis.

23. The procedure according to claim 22, wherein the central ray (11) is always perpendicular to the surface of the detector (3).

24. The procedure according to claim 19, wherein the object (4) passes right through the cone beam (10) during each partial trajectory.

\* \* \* \* \*